US010924496B1

(12) United States Patent
Gu et al.

(10) Patent No.: US 10,924,496 B1
(45) Date of Patent: Feb. 16, 2021

(54) SYSTEMS AND METHODS FOR MANAGING LOCATION-BASED ACCESS CONTROL LISTS

(71) Applicant: Symantec Corporation, Mountain View, CA (US)

(72) Inventors: Lei Gu, Bedford, MA (US); Ilya Sokolov, Boston, MA (US)

(73) Assignee: NORTONLIFELOCK, INC., Tempe, AZ (US)

( * ) Notice: Subject to any disclaimer, the term of this patent is extended or adjusted under 35 U.S.C. 154(b) by 140 days.

(21) Appl. No.: 16/228,935

(22) Filed: Dec. 21, 2018

(51) Int. Cl.
*G06K 9/00* (2006.01)
*G10L 17/00* (2013.01)
*H04L 29/06* (2006.01)

(52) U.S. Cl.
CPC ........ *H04L 63/107* (2013.01); *G06K 9/00362* (2013.01); *G10L 17/00* (2013.01)

(58) Field of Classification Search
None
See application file for complete search history.

(56) References Cited

U.S. PATENT DOCUMENTS

| 10,257,179 | B1* | 4/2019 | Saylor | H04L 63/08 |
|---|---|---|---|---|
| 2015/0121475 | A1* | 4/2015 | Cashman | H04L 63/126 726/4 |
| 2017/0156026 | A1* | 6/2017 | Reudink | H04W 4/02 |

OTHER PUBLICATIONS

Olivarez-Giles, Nathan, "iRobot's Roomba 980 Maps Your Home Via Camera and Takes Smartphone Commands", Personal Tech News, Sep. 16, 2015, 3 pages.
Gu et al., "Systems and Methods for Enforcing Access-Control Policies in an Arbitrary Physical Space", U.S. Appl. No. 15/195,677, filed Jun. 28, 2016, 52 pages.

* cited by examiner

*Primary Examiner* — Idowu O Osifade
(74) *Attorney, Agent, or Firm* — FisherBroyles, LLP (57) ABSTRACT

The disclosed computer-implemented method for managing location-based access control lists may include (i) identifying a collection of devices that are located within a physical space, (ii) determining, based on user activity data received from the collection of devices, that an authorized user is attempting to modify, on a location-based access control list for a wireless network, the access rights of a target computing device near a location indicated by the authorized user in the physical space, (iii) detecting, based on the user activity data, the target computing device near the location indicated by the authorized user, and (iv) in response to detecting the target computing device indicated by the authorized user, modifying, on the location-based access control list, the access rights of the target computing device. Various other methods, systems, and computer-readable media are also disclosed.

20 Claims, 7 Drawing Sheets

SYSTEMS AND METHODS FOR MANAGING LOCATION-BASED ACCESS CONTROL LISTS

BACKGROUND

Individuals and organizations frequently seek to control how others access services under their control. For example, a parent may wish to enforce parental controls on televisions and smart phones in their household in order to control their child's access to various digital media. Similarly, an organization may wish to limit websites that its employees can access during work hours. In some cases, an individual or organization may use different access-control policies for certain people. For example, a parent can input a passcode to bypass parental controls so that they can watch movies that would otherwise be blocked. As an additional example, a project manager may have access to files and/or servers that other employees may be restricted from accessing.

Traditional access-control techniques suffer from a number of drawbacks. for example, existing access-control solutions may not permit a device to easily join a wireless network without sharing the Wi-Fi credentials of the network with the new device. For example, if a guest of a user wishes to gain access to a home wireless network, the user must provide the Wi-Fi credentials to the guest to enable the guest to add their device to the home wireless network. If the user does not want the user to have subsequent access to the home wireless network, they may need to change the Wi-Fi credentials and update all the devices that utilized the previous credentials.

In another example, the user may utilize a Wi-Fi protected setup (WPS), which is a network security standard, to create a secure wireless network. When the WPS is enabled, a router of the wireless network may allow any device in range to connect to the router within a specific time window. However, during the time window, the wireless network may be available to any device within range and an unknown or hostile device may easily join the wireless network. Accordingly, the instant disclosure identifies and addresses a need for improved systems and methods for managing location-based access control lists.

SUMMARY

As will be described in greater detail below, the instant disclosure describes various systems and methods for managing location-based access control lists.

In one example, a method for managing location-based access control lists may include (i) identifying a collection of devices that are located within a physical space and that include monitoring devices that are capable of monitoring user activity within the physical space, (ii) determining, based on user activity data received from the collection of devices, that an authorized user is attempting to modify, on a location-based access control list for a wireless network, the access rights of a target computing device near a location indicated by the authorized user in the physical space, (iii) detecting, based on the user activity data, the target computing device near the location indicated by the authorized user, and (iv) in response to detecting the target computing device indicated by the authorized user, modifying, on the location-based access control list, the access rights of the target computing device.

In some examples, the user activity data may include a photograph or video recording of the authorized user. Detecting the target computing device near the location indicated by the authorized user may include analyzing the photograph or the video recording, identifying the location in the physical space based on the analyzed photograph or video recording, and detecting the target computing device near the location indicated by the authorized user. The analyzed photograph or video recording may include data indicating the authorized user pointing to the target computing device with a hand or a pointing device.

In some examples, the user activity may include an audio recording of the authorized user. Detecting the target computing device near the location indicated by the authorized user based on the user activity data may include analyzing the audio recording, identifying the location in the physical space based on the analyzed audio recording, and detecting the target computing device near the location indicated by the authorized user.

In some examples, modifying the location-based access control list may include at least one of adding the target computing device to the location-based access control list or removing the target computing device from the location-based access control list. In some examples, the location-based access control list may be enforced based on one or more scheduling policies. In some examples, detecting the target computing device near the location in the physical space may include detecting a location associated with signals received from the target computing device using triangulation and detecting the target computing device by comparing the location of the signals to the location indicated by the authorized user in the physical space.

In one embodiment, a system for managing location-based access control lists may include at least one physical processor and physical memory that includes computer-executable instructions that, when executed by the physical processor, cause the physical processor to (i) identify a collection of devices that are located within a physical space and that include monitoring devices that are capable of monitoring user activity within the physical space, (ii) determine, based on user activity data received from the collection of devices, that an authorized user is attempting to modify, on a location-based access control list for a wireless network, the access rights of a target computing device near a location indicated by the authorized user in the physical space, (iii) detect, based on the user activity data, the target computing device near the location indicated by the authorized user, and (iv) in response to detecting the target computing device indicated by the authorized user, modify, on the location-based access control list, the access rights of the target computing device.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a collection of devices that are located within a physical space and that include monitoring devices that are capable of monitoring user activity within the physical space, (ii) determine, based on user activity data received from the collection of devices, that an authorized user is attempting to modify, on a location-based access control list for a wireless network, the access rights of a target computing device near a location indicated by the authorized user in the physical space, (iii) detect, based on the user activity data, the target computing device near the location indicated by the authorized user, and (iv) in response to detecting the target computing device indicated by the authorized user, modify, on the location-based access control list, the access rights of the target computing device.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for managing location-based access control lists. As will be described in greater detail below, location-based access control lists may be modified by monitoring a physical space using a constellation of additional devices. These additional devices may perform a variety of monitoring functions, such as identifying and authenticating an authorized user to the system and/or capturing user activity through videos, photographs, or audio recordings. The systems and methods described herein may analyze the user activity to identify a location indicated by the authorized user and detect a device near the location. Upon detecting the device near the location, the location-based access control list may be modified to permit the device to join the wireless network.

In an illustrative example, Alice and Bob may be sitting in the living room of Bob's home. Alice may want her tablet to be connected to the home wireless network in Bob's home so that she can watch a movie. The systems and methods described herein may allow Bob to add Alice's tablet to the home wireless network by indicating the position of the tablet. The living room may have multiple devices, such as a smart television, a laptop, a smartphone, and a smart speaker. Bob may indicate that he wishes to add a device to wireless network by vocalizing a command and/or performing a gesture and then indicating the location of the device. One or more of the devices in the living room may capture the command or gesture and then capture Bob's activity, such as pointing his finger or a laser pointer towards the tablet. The systems and methods described herein may identify a location indicated by Bob, detect tablet near the location indicated by Bob, and then modify the location-based access control list to enable Alice's tablet to join the wireless network without having to share the credentials to join the network and ensuring that the network is secure from unauthorized access by other devices.

Figure 1:
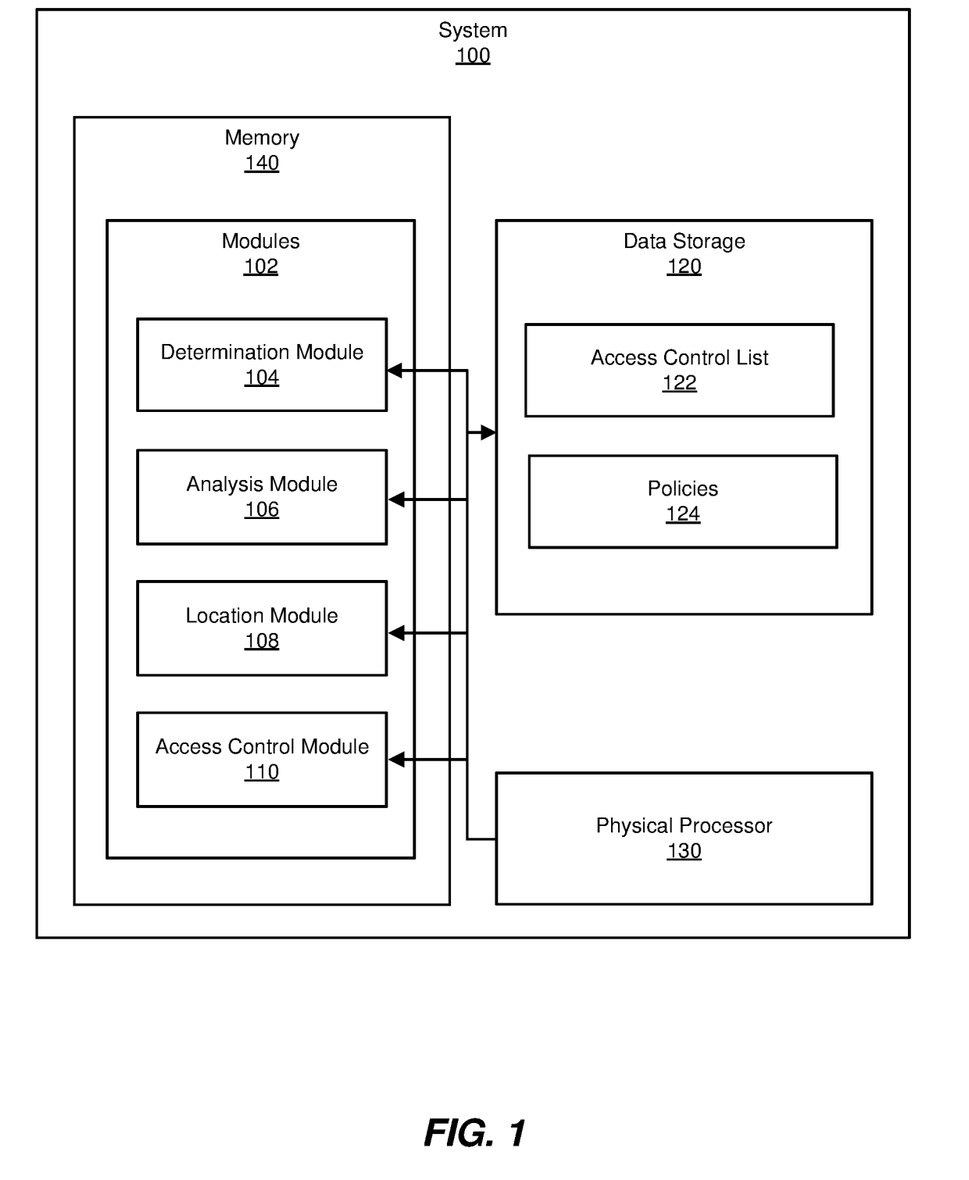
FIG. 1 is a block diagram of an example system for managing location-based access control lists.
Figure 2:
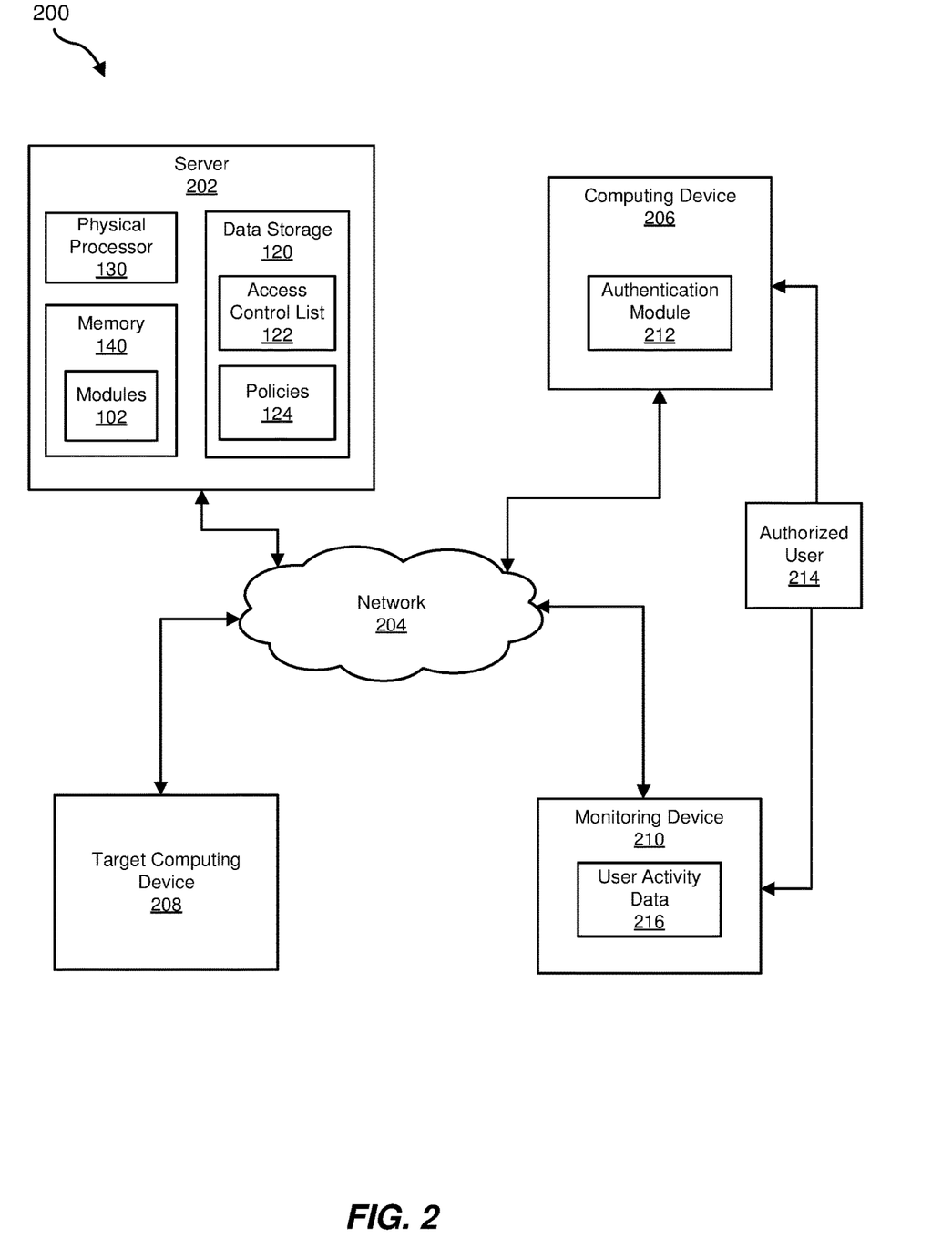
FIG. 2 is a block diagram of an additional example system for managing location-based access control lists.
Figure 4:
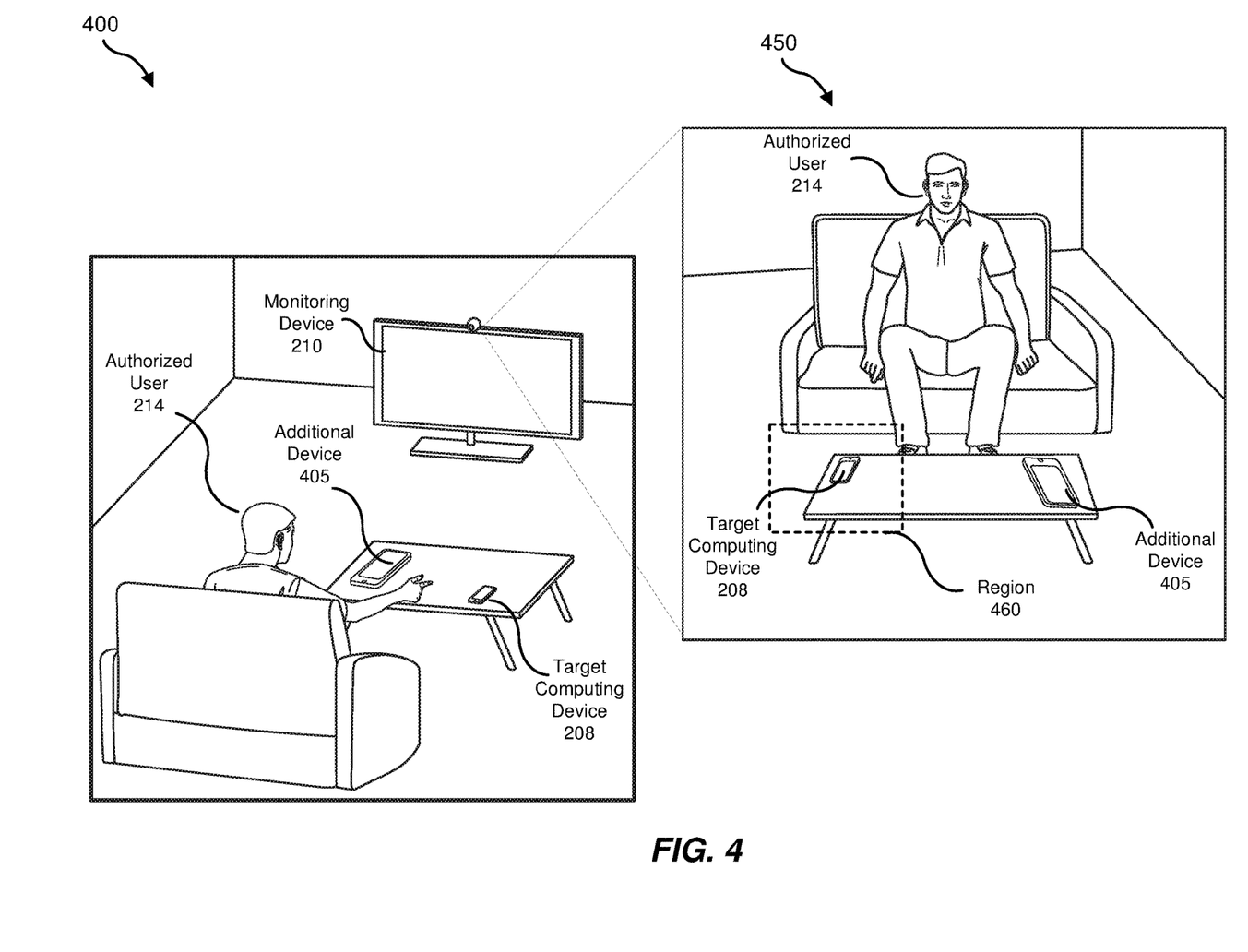
FIG. 4 is an illustrative diagram of a use case for managing location-based access control lists.
Figure 5:
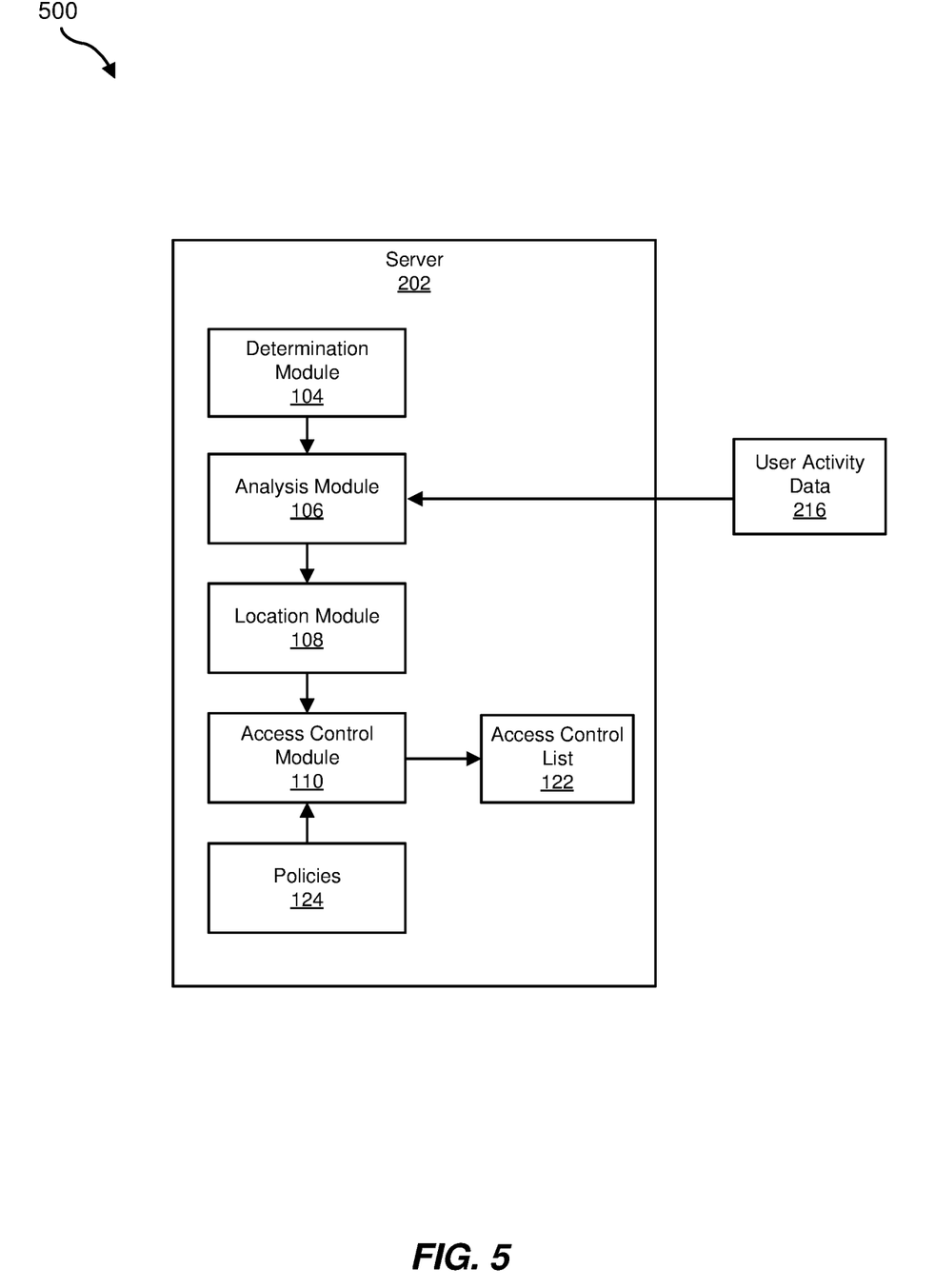
FIG. 5 is a data flow diagram of an example system for managing location-based access control lists.

The following will provide, with reference to FIGS. 1-2, detailed descriptions of example systems for managing location-based access control lists. Detailed descriptions of corresponding computer-implemented methods will also be provided in connection with FIG. 3. FIG. 4 provides an illustrative use case for managing location-based access control lists. A detailed description of data flow through the example system for managing location-based access control lists will also be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of an example system 100 for managing location-based access control lists. As illustrated in this figure, the example system 100 may include one or more modules 102 for performing one or more tasks. As will be explained in greater detail below, the modules 102 may include a determination module 104, an analysis module 106, a location module 108, and an access control module 110. Although illustrated as separate elements, one or more of the modules 102 in FIG. 1 may represent portions of a single module or application.

In certain embodiments, one or more of the modules 102 in FIG. 1 may represent one or more software applications or programs that, when executed by a computing device, may cause the computing device to perform one or more tasks. For example, and as will be described in greater detail below, one or more of the modules 102 may represent modules stored and configured to run on one or more computing devices, such as the devices illustrated in FIG. 2 (e.g., a server 202, a computing device 206, a target computing device 208, and/or a monitoring device 210). One or more of the modules 102 in FIG. 1 may also represent all or portions of one or more special-purpose computers configured to perform one or more tasks.

As illustrated in FIG. 1, the example system 100 may also include one or more memory devices, such as memory 140. The memory 140 generally represents any type or form of volatile or non-volatile storage device or medium capable of storing data and/or computer-readable instructions. In one example, the memory 140 may store, load, and/or maintain one or more of modules 102. Examples of the memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, the example system 100 may also include one or more physical processors, such as physical processor 130. The physical processor 130 generally represents any type or form of hardware-implemented processing unit capable of interpreting and/or executing computer-readable instructions. In one example, the physical processor 130 may access and/or modify one or more of the modules 102 stored in the memory 140. Additionally, or alternatively, the physical processor 130 may execute one or more of the modules 102 to facilitate managing location-based access control lists. Examples of the physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, the example system 100 may also include data storage 120. The data storage 120 generally represents any type or form of computing device capable of data storage. In one example, the data storage 120 may store one or more access control lists 122 and/or one or more policies 124.

The example system 100 in FIG. 1 may be implemented in a variety of ways. For example, all or a portion of the example system 100 may represent portions of example system 200 in FIG. 2. As shown in FIG. 2, the system 200 may include a server 202 in communication with a computing device 206, a target computing device 208, and/or a monitoring device 210 via a network 204. In one example, all or a portion of the functionality of the modules 102 may be performed by the server 202, the computing device 206, the target computing device 208, the monitoring device 210, and/or any other suitable computing system. As will be described in greater detail below, one or more of the modules 102 from FIG. 1 may, when executed by at least one processor of the server 202, the computing device 206, the target computing device 208, and/or the monitoring device 210, enable the server 202, the computing device 206, the target computing device 208, and/or the monitoring device 210 to manage location-based access control lists 122. For example, and as will be described in greater detail below, one or more of the modules 102 may cause the server 202 to identify a collection of devices that are located within a physical space. The collection of devices may include one or more monitoring devices, such as the monitoring device 210, that are capable of monitoring user activity within the physical space. The server 202 may determine, based on user activity data 216 received from the collection of devices, that an authorized user 214 is attempting to modify, on a location-based access control list 122 for a wireless network, the access rights of the target computing device 208 near a location indicated by the authorized user 214 in the physical space. The server 202 may detect, based on the user activity data 216, the target computing device 208 near the location indicated by the authorized user 214. In response to detecting the target computing device 208, the server 202 may modify the access rights of the target computing device 208 on the location-based access control list 122.

The server 202 generally represents any type or form of computing device that is capable of reading computer-executable instructions. In one example, the server 202 may represent a server capable of managing location-based access control lists 122. Additional examples of the server 202 include, without limitation, security servers, application servers, web servers, storage servers, and/or database servers configured to run certain software applications and/or provide various security, web, storage, and/or database services. Although illustrated as a single entity in FIG. 2, the server 202 may include and/or represent a plurality of servers that work and/or operate in conjunction with one another.

The computing device 206 generally represents any type or form of computing device capable of reading computer-executable instructions. For example, the computing device 206 may include an endpoint device (e.g., a mobile computing device) running client-side security software. In some examples, the computing device 206 may include an authentication module 212 to identify and authenticate the authorized user 214. Additional examples of the computing device 206 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

The target computing device 208 generally represents any type or form of computing device capable of reading computer-executable instructions. For example, the target computing device 208 may include an endpoint device (e.g., a mobile computing device) running client-side security software. Additional examples of the target computing device 208 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

The monitoring device 210 generally represents any type or form of computing device capable of reading computer-executable instructions. For example, the monitoring device 210 may include an endpoint device (e.g., a mobile computing device) running client-side security software capable of monitoring a physical space to identify and authenticate an authorized user 214 as well as capture user activity data 216. Additional examples of the monitoring device 210 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

The network 204 generally represents any medium or architecture capable of facilitating communication or data transfer. In one example, the network 204 may facilitate communication between the server 202, the computing device 206, the target computing device 208, and/or the monitoring device 210. In this example, the network 204 may facilitate communication or data transfer using wireless and/or wired connections. Examples of the network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
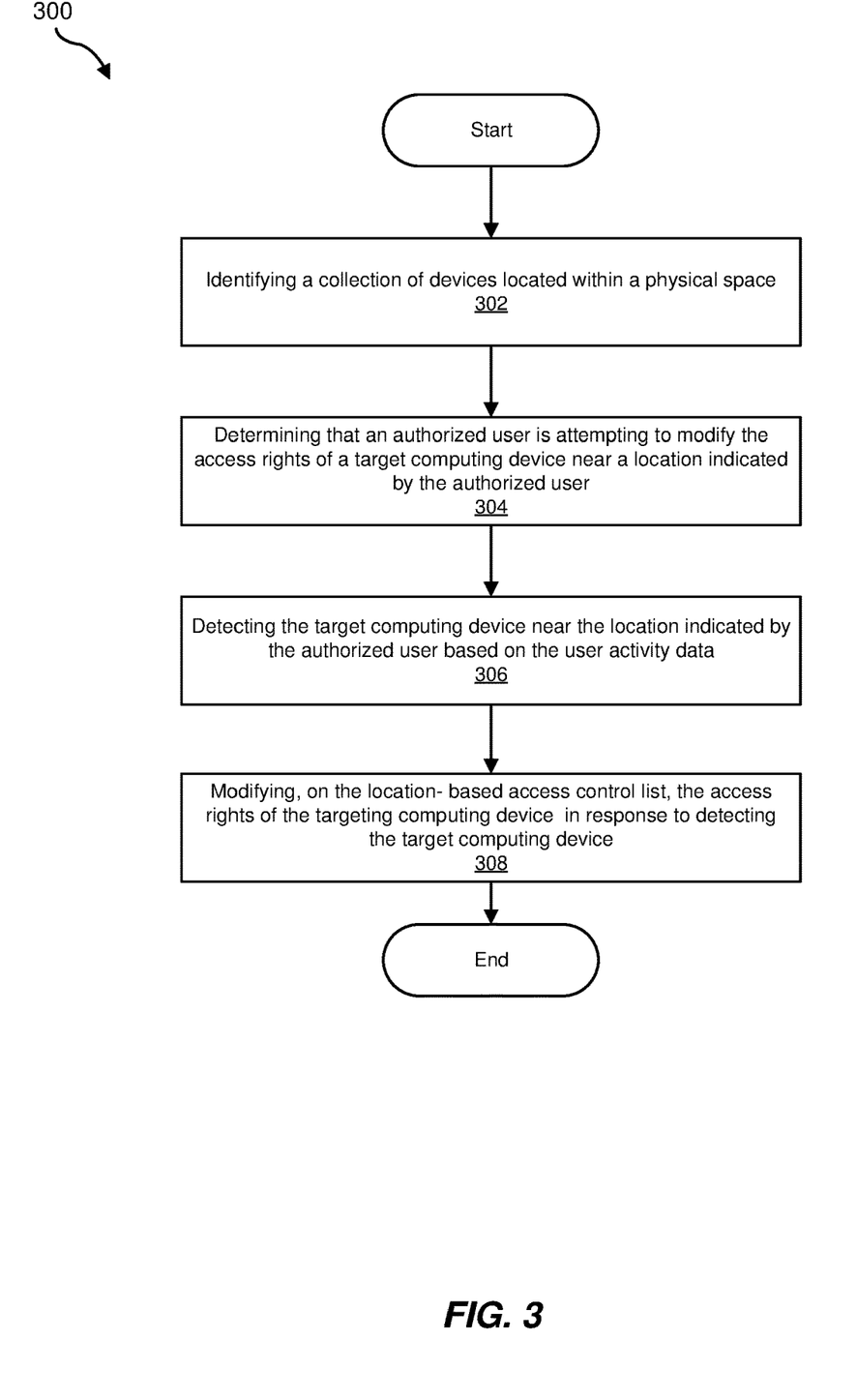
FIG. 3 is a flow diagram of an example method for managing location-based access control lists.

FIG. 3 is a flow diagram of an example computer-implemented method 300 for managing location-based access control lists. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may identify a collection of devices located within a physical space. The system may identify the collection of devices in any suitable manner. For example, the determination module 104 may, as part of server 202 in FIG. 2, determine relative physical locations for each device based on data received from the collection of devices, such as the monitoring devices 210. That is, the determination module 104 may determine which devices are within a physical proximity to each other.

The determination module 104 may determine that devices are in physical proximity to each other in a variety of ways, including but not limited to evaluating wireless signal strengths, analyzing information captured through a monitoring function of the monitoring device 210 (e.g., analyzing an image captured by a camera of a smartphone), comparing GPS coordinates, and/or any other suitable method of determining that various devices are in physical proximity of each other. For example, the determination module 104 may direct a game console to scan for wireless signals and capture an image through a peripheral device attached to the game system. The determination module 104 may then determine that various other devices are in proximity to the game system based on the wireless signals detected and/or any objects recognized in the captured image.

The term "monitoring device," as used herein, generally refers to any device or combination of devices that is capable of capturing information about its surroundings and providing that information to another device. Monitoring devices may include a variety of components capable of capturing information about a user, such as a camera, microphone, infrared sensor, wireless antenna, or any other suitable component capable of capturing information of a physical space. Examples of monitoring devices include, without limitation, laptops, smart phones, smart watches, smart TVs, tablet computers, security cameras, and/or any other device that is capable of capturing information about a physical space.

In some examples, the determination module 104 may triangulate the position of a device based on wireless signals received from the device at a collection of access points. Additionally, or alternatively, the determination module 104 may retrieve location information from a database that associates devices with physical locations. For example, the determination module 104 may retrieve location information from a registry maintained by the server 202 that contains physical-location information associated with each device in the registry. Additionally, or alternatively, the determination module 104 may request physical-location information from the device, such as GPS coordinates, and determine the physical location of the device based on the physical-location information.

At step 304, one or more of the systems described herein may determine that an authorized user, such as the authorized user 214, is attempting to modify the access control rights of the target computing device 208 on the access control list 122 near a location indicated by the authorized user 214. The system may perform this step in any suitable manner. For example, the analysis module 106 may receive and analyze user activity data 216 captured by one or more of the collection of devices, such as the monitoring device 210, to determine that the authorized user 214 is attempting to modify the access control rights of the target computing device 208.

The term "authorized user," as used herein, generally refers to any individual that has been identified and authenticated by the system. An authorized user may be a user who has permission, or has been granted permission, to modify the access control lists 122 associated with a wireless network. The authorized user may be authenticated by providing credentials, such as a password on a computing device or fingerprint on a fingerprint reader of a computing device. In some examples, one or more of the collection of devices may identify the authorized user through authentication techniques, such as facial recognition, voice recognition, or the like.

The term "user activity data," as used herein, generally refers to data captured by a computing device, such as monitoring device 210, in the physical space, indicative of activity of the authorized user 214. The user activity data 216 may be captured in the form of audio or video recordings, photographs, or the like. Examples of the user activity that may be captured by the user activity data 216 may include, but are not limited to, voice commands or conversation, hand gestures, pointing to objects with hands or a pointing device, movement around the physical space, or the like.

The term "target computing device," as used herein, generally refers to any computing device in the physical space for which the authorized user would like to modify the access rights on the access control list. Examples of the target computing device include, without limitation, laptops, smart phones, smart watches, smart TVs, tablet computers, security cameras, and/or any other device that is capable of joining a wireless network.

In some examples, one or more monitoring devices 210 in the physical space may capture user activity data 216 in the form of a photograph or a video recording. The user activity data 216 may include data indicative of the authorized user 214 performing a gesture and/or using a pointing device. The analysis module 106 may determine, by analyzing the user activity data 216, that the authorized user 214 is attempting to modify the access rights of the target computing device 208. In some examples, the authorized user 214 may issue a voice command or perform a gesture indicating their wish to modify the access rights of the target computing device 208. The monitoring device 210 may identify the voice command and, in response to identify the command, capture user activity data 216 and transmit the user activity data to the server 202.

The analysis module 106 may analyze the user activity data 216 to detect a location indicated by the authorized user 214. In some examples, the analysis module 106 may analyze the photograph or video recording to detect a gesture, such as finger pointing, or the presence of a pointing device, such as a laser pointer, that is directed to a location in the physical space. The analysis module 106 may identify the location in the physical space indicated by the authorized user 214 using known techniques for location detection. The analysis module 106 may calculate a region within the physical space based on the location indicated by the authorized user 214. The analysis module 106 may user one or more policies 124 to determine a region of a predetermined distance from the location identified by the authorized user 214. For example, a policy 124 may indicate that the region in the physical space should include the area that is twelve inches in any direction from the location in the physical space. The analysis module 106 may pass the identified location and the determined region in the physical space to the location module 108.

In some examples, one or more monitoring devices 210 in the physical space may capture user activity data 216 in the form of an audio recording. The user activity data 216 may include data indicative of the authorized user 214 speaking while in the physical space. The analysis module 106 may determine, by analyzing the user activity data 216, that the authorized user 214 is attempting to modify the access rights of the target computing device 208. For example, the analysis module 106 may analyze the user activity data 216 using audio analysis techniques to identify words or phrases. The authorized user 214 may say a phrase that indicates their wish to modify the access rights of the target computing device 208. The monitoring device 210 may identify the voice command and, in response to the voice command, capture user activity data 216 in the form of an audio recording and transmit the user activity data 216 to the server 202.

The analysis module 106 may analyze the user activity data 216 to detect a location indicated by the authorized user. In some examples, the analysis module 106 may analyze the audio recording to identify a region in the physical space. The analysis module 106 may identify the location in the physical space indicated by the authorized user 214 in the audio recording. For example, the authorized user 214 may say "the left side of the coffee table" or "the southwest corner of the living room." The analysis module 106 may retrieve data, such as a map of the physical room previously generated using the data collected by the collection of devices in the physical space. The analysis module 108 may identify a location within the physical space based on the user activity data 216. The analysis module 106 may user one or more policies 124 to determine a region of a predetermined distance from the location identified by the authorized user 214. The analysis module 106 may pass the identified location and the determined region in the physical space to the location module 108.

In some examples, the authorized user 214 may identify a boundary in the physical space, by stating "the kitchen" or "the living room." The analysis module 106 may retrieve data that indicates the region in the physical space that corresponds to the identified boundary. The analysis module may pass the data identifying the region in the physical space to the location module 108.

In some examples, the analysis module 106 may analyze the audio recording to identify one or more characteristics of the target computing device 208 identified by the authorized user 214. The analysis module 108 may obtain and analyze a photograph or video recording captured by the monitoring device 210 and to detect the location the target computing device 208 in the physical space. For example, the authorized user 214 may say "add the tablet with the red case to the network." The analysis module 108 may parse the audio recording to determine that the target computing device 208 is a tablet that has a red case. The analysis module 108 may obtain the photograph or video recording of the physical space and analyze the photograph or video recording to identify the target computing device 208. Upon detecting the target computing device 208, the analysis module 108 may determine a location associated with the target computing device 208. The analysis module 106 may calculate a region within the physical space based on the location indicated by the authorized user 214. The analysis module 106 may user one or more policies 124 to determine a region of a predetermined distance from the location identified by the authorized user 214. The analysis module 106 may pass the identified location and the determined region in the physical space to the location module 108.

At step 306 one or more of the systems described herein may detect the target computing device 208 near the location indicated by the authorized user 214 based on the user activity data 216 captured by the monitoring device 210. The system may perform this step in any suitable manner. For example, the location module 108 may, as part of server 202 in FIG. 2, detect a location associated with signals received from the target computing device 208 using triangulation techniques. The location module 108 may compare the location of the signals to the location indicated by the authorized user 214 in the physical space. For example, the location module 108 may identify the location of the target computing device 208 by detecting incoming WPS handshake signals from the target computing device 208 and comparing the location of the WPS handshake signals to the location indicated by the authorized user 214.

At step 308 one or more of the systems described herein may modify the access rights of the target computing device 208 on the location-based access control list in response to detecting the target computing device 208. The system may perform this step in any suitable manner. The access control module 110 may, as part of server 202 in FIG. 2, modify the access rights of the target computing device 208 on the access control list 122 based on one or more instructions from the authorized user 214 and/or one or more policies 124. In some examples, the access control module 110 may determine the type of modification requested by the authorized user 214 based on the user activity data 216. For example, the authorized user may indicate using voice commands to modify the access control list 122 to add or remove the target computing device from the access control list 122. The authorized user may indicate the type of modification by interacting with a computing device 206 and selecting the type of modification. In some examples, the authorized user 214 may perform a specific gesture associated with a type of modification, which may be identified from user activity data 216 captured by the monitoring device 210.

In some examples, the access control module 110 may modify the access rights of the target computing device 208 based on an indication from the authorized user 214 and one or more policies 124, such as scheduling policies or boundary policies. The authorized user 214 may have designated a schedule to permit wireless network access. For example, a parent may wish to limit the amount of screen time for a child and their friends after 5:00 PM. If the child's friend wishes to join the wireless network, the parent may identify the device. The systems and methods herein may detect the device identified by the parent but may not enable access for the device to join the wireless network because the scheduling policy indicates that no devices are able to join the wireless network after the designated time.

In another example, a boundary policy may prohibit devices from joining the wireless network if they enter a designated area, such as a bedroom. Accordingly, in the scenario described above, the systems and methods herein may detect the device identified by the parent and enable access for the device to join the wireless network. However, the systems and methods described herein may disable the wireless network access if the device is moved to a prohibited area, such as the child's bedroom. The wireless access may be re-enabled once the device has been moved away from the prohibited area.

FIG. 4 is an illustrative diagram 400 of a use case for managing location-based access control lists. As depicted in FIG. 4, an authorized user 214 may be sitting on a couch in a living. Multiple devices may be located within the living room, such as a smart television, and multiple computing devices located on a coffee table, such as a smartphone (e.g., target computing device 208) and a tablet (e.g., additional device 405). The smart television may be the monitoring device 210 capable of monitoring user activity within the physical space (e.g., living room). In some examples, the authorized user 214 may perform a gesture with his hand, such as pointing towards the right side of the coffee table. The monitoring device 210 may capture a photograph 450 of the user activity in the living and transmit the user activity data 216 (e.g., photograph 450) to the server 202. The analysis module 108 of the server 202 may analyze the photograph 450 and determine that the authorized user 214 is pointing to a location in the physical space (e.g., the right side of the coffee table). In some examples, the analysis module 108 may identify the location within the physical space and determine a region 460 within the physical space based on the location and one or more policies 124 that may specify the size of the region. The analysis module 106 may communicate with the location module 108 to detect the target computing device 208 located within the region 460 and may modify the access control rights of the target computing device 208 in the access control list 122 based on the user activity data 216 of the authorized user 214 captured by the monitoring device 210. The access rights of the additional device 405 may not be modified as they are not located within the region 460 indicated by the authorized user 214.

The example system 100 in FIG. 1 may be implemented in a variety of ways. For example, all or a portion of the example system 100 may represent portions of the system 500 in FIG. 5. As will be described in greater detail below, one or more of the modules 102 from FIG. 1 may, when executed by at least one processor of the server 202, enable the system 500 to manage location-based access control lists. For example, and as will be described in greater detail below, one or more of the modules 102 may cause the example system 500 to identify, by a determination module 104, a collection of devices located within a physical space. The collection of devices in the physical space may include one or more monitoring devices, such as the monitoring device 210, that are capable of monitoring and capturing user activity within the physical space. The analysis module 106 may receive user activity data 216 from the collection of devices and determine, based on the received user activity data 216, that an authorized user 214 is attempting to modify, on a location-based access control list 122 for a wireless network, the access rights of a target computing device 208 near a location 460 indicated by the authorized user 214 in the physical space. The location module 108 may detect, based on the user activity data 216, the target computing device 208 near the location 460 indicated by the authorized user 214. In response to detecting the target computing device 208 indicated by the authorized user 214, the access control module 110 may modify the access rights of the target computing device 208 on the location-based access control list 122 to enable the target computing device 208 to join the wireless network.

Existing access-control solutions may not permit a device to easily or securely join a wireless network without sharing the Wi-Fi credentials of the network with the new device. If a user shares the Wi-Fi credentials of a wireless network with a guest device but does not want the guest device to have subsequent access to the network, the user may need to change the Wi-Fi credentials and update all the devices that utilized the previous credentials. In another example, the user may utilize a Wi-Fi protected setup which may enable a router of the wireless network may allow any device in range to connect to the router within a specific time window. However, during the time window, the wireless network may be available to any device within range and a hostile device may easily join the wireless network. The systems and methods described herein are directed to managing location-based access control lists that may be modified by monitoring a physical space using a constellation of additional devices. These additional devices may perform a variety of monitoring functions, such as identifying and authenticating an authorized user to the system and/or capturing user activity through videos, photographs, or audio recordings. The systems and methods described herein may analyze the user activity to identify a location indicated by the authorized user and detect a device near the location. Upon detecting the device near the location, the location-based access control list may be modified to permit the device to join the wireless network.

Figure 6:
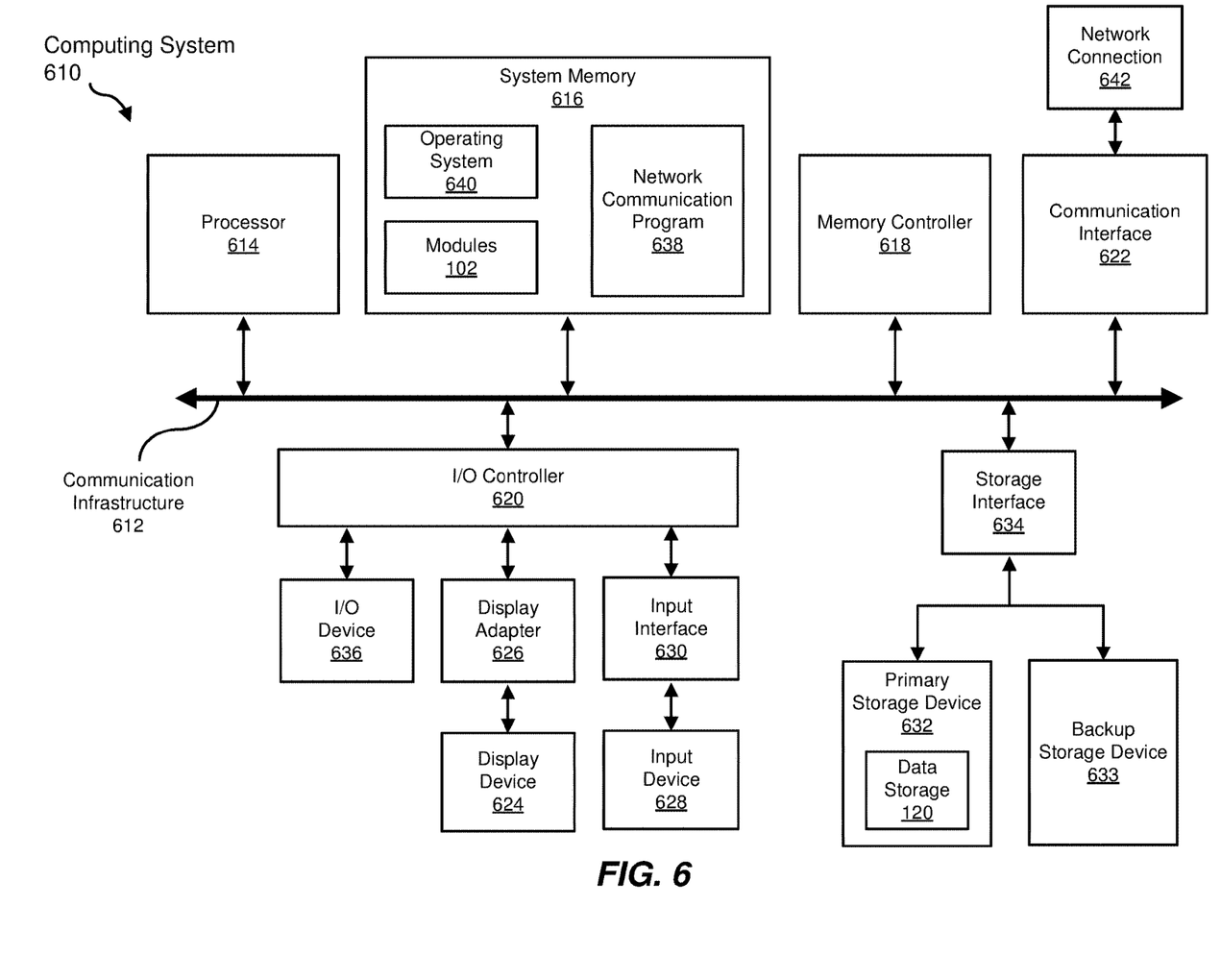
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of the computing system 610 may perform and/or be a means for performing, either alone or in combination with other elements, one or more of the steps described herein (such as one or more of the steps illustrated in FIGS. 3-4). All or a portion of the computing system 610 may also perform and/or be a means for performing any other steps, methods, or processes described and/or illustrated herein.

The computing system 610 broadly represents any single or multi-processor computing device or system capable of executing computer-readable instructions. Examples of the computing system 610 include, without limitation, workstations, laptops, client-side terminals, servers, distributed computing systems, handheld devices, or any other computing system or device. In its most basic configuration, the computing system 610 may include at least one processor 614 and a system memory 616.

The processor 614 generally represents any type or form of physical processing unit (e.g., a hardware-implemented central processing unit) capable of processing data or interpreting and executing instructions. In certain embodiments, the processor 614 may receive instructions from a software application or module. These instructions may cause the processor 614 to perform the functions of one or more of the example embodiments described and/or illustrated herein.

The system memory 616 generally represents any type or form of volatile or non-volatile storage device or medium capable of storing data and/or other computer-readable instructions. Examples of the system memory 616 include, without limitation, Random Access Memory (RAM), Read Only Memory (ROM), flash memory, or any other suitable memory device. Although not required, in certain embodiments, the computing system 610 may include both a volatile memory unit (such as, for example, system memory 616) and a non-volatile storage device (such as, for example, primary storage device 632, as described in detail below). In one example, one or more of the modules 102 from FIG. 1 may be loaded into the system memory 616.

In some examples, the system memory 616 may store and/or load an operating system 640 for execution by the processor 614. In one example, the operating system 640 may include and/or represent software that manages computer hardware and software resources and/or provides common services to computer programs and/or applications on the computing system 610. Examples of the operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, the example computing system 610 may also include one or more components or elements in addition to the processor 614 and the system memory 616. For example, as illustrated in FIG. 6, the computing system 610 may include a memory controller 618, an Input/Output (I/O) controller 620, and a communication interface 622, each of which may be interconnected via a communication infrastructure 612. The communication infrastructure 612 generally represents any type or form of infrastructure capable of facilitating communication between one or more components of a computing device. Examples of the communication infrastructure 612 include, without limitation, a communication bus (such as an Industry Standard Architecture (ISA), Peripheral Component Interconnect (PCI), PCI Express (PCIe), or similar bus) and a network.

The memory controller 618 generally represents any type or form of device capable of handling memory or data or controlling communication between one or more components of the computing system 610. For example, in certain embodiments, the memory controller 618 may control communication between the processor 614, the system memory 616, and the I/O controller 620 via the communication infrastructure 612.

The I/O controller 620 generally represents any type or form of module capable of coordinating and/or controlling the input and output functions of a computing device. For example, in certain embodiments, the I/O controller 620 may control or facilitate transfer of data between one or more elements of the computing system 610, such as the processor 614, the system memory 616, the communication interface 622, the display adapter 626, the input interface 630, and the storage interface 634.

As illustrated in FIG. 6, the computing system 610 may also include at least one display device 624 coupled to the I/O controller 620 via a display adapter 626. The display device 624 generally represents any type or form of device capable of visually displaying information forwarded by the display adapter 626. Similarly, the display adapter 626 generally represents any type or form of device configured to forward graphics, text, and other data from the communication infrastructure 612 (or from a frame buffer, as known in the art) for display on the display device 624.

As illustrated in FIG. 6, the example computing system 610 may also include at least one input device 628 coupled to the I/O controller 620 via an input interface 630. The input device 628 generally represents any type or form of input device capable of providing input, either computer or human generated, to example computing system 610. Examples of the input device 628 include, without limitation, a keyboard, a pointing device, a speech recognition device, variations or combinations of one or more of the same, and/or any other input device.

Additionally or alternatively, the example computing system 610 may include additional I/O devices. For example, the example computing system 610 may include the I/O device 636. In this example, the I/O device 636 may include and/or represent a user interface that facilitates human interaction with the computing system 610. Examples of the I/O device 636 include, without limitation, a computer mouse, a keyboard, a monitor, a printer, a modem, a camera, a scanner, a microphone, a touchscreen device, variations or combinations of one or more of the same, and/or any other I/O device.

The communication interface 622 broadly represents any type or form of communication device or adapter capable of facilitating communication between the example computing system 610 and one or more additional devices. For example, in certain embodiments, the communication interface 622 may facilitate communication between the computing system 610 and a private or public network including additional computing systems. Examples of the communication interface 622 include, without limitation, a wired network interface (such as a network interface card), a wireless network interface (such as a wireless network interface card), a modem, and any other suitable interface. In at least one embodiment, the communication interface 622 may provide a direct connection to a remote server via a direct link to a network, such as the Internet. The communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, the communication interface 622 may also represent a host adapter configured to facilitate communication between the computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. The communication interface 622 may also allow the computing system 610 to engage in distributed or remote computing. For example, the communication interface 622 may receive instructions from a remote device or send instructions to a remote device for execution.

In some examples, the system memory 616 may store and/or load a network communication program 638 for execution by the processor 614. In one example, the network communication program 638 may include and/or represent software that enables the computing system 610 to establish a network connection 642 with another computing system (not illustrated in FIG. 6) and/or communicate with the other computing system by way of the communication interface 622. In this example, the network communication program 638 may direct the flow of outgoing traffic that is sent to the other computing system via the network connection 642. Additionally, or alternatively, the network communication program 638 may direct the processing of incoming traffic that is received from the other computing system via the network connection 642 in connection with the processor 614.

Although not illustrated in this way in FIG. 6, the network communication program 638 may alternatively be stored and/or loaded in the communication interface 622. For example, the network communication program 638 may include and/or represent at least a portion of software and/or firmware that is executed by a processor and/or Application Specific Integrated Circuit (ASIC) incorporated in the communication interface 622.

As illustrated in FIG. 6, the example computing system 610 may also include a primary storage device 632 and a backup storage device 633 coupled to the communication infrastructure 612 via a storage interface 634. The storage devices 632 and 633 generally represent any type or form of storage device or medium capable of storing data and/or other computer-readable instructions. For example, the storage devices 632 and 633 may be a magnetic disk drive (e.g., a so-called hard drive), a solid state drive, a floppy disk drive, a magnetic tape drive, an optical disk drive, a flash drive, or the like. The storage interface 634 generally represents any type or form of interface or device for transferring data between the storage devices 632 and 633 and other components of the computing system 610. In one example, the data storage 120 from FIG. 1 may be stored and/or loaded in the primary storage device 632.

In certain embodiments, the storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. The storage devices 632 and 633 may also include other similar structures or devices for allowing computer software, data, or other computer-readable instructions to be loaded into the computing system 610. For example, the storage devices 632 and 633 may be configured to read and write software, data, or other computer-readable information. The storage devices 632 and 633 may also be a part of the computing system 610 or may be a separate device accessed through other interface systems.

Many other devices or subsystems may be connected to the computing system 610. Conversely, all of the components and devices illustrated in FIG. 6 need not be present to practice the embodiments described and/or illustrated herein. The devices and subsystems referenced above may also be interconnected in different ways from that shown in FIG. 6. The computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into the computing system 610. All or a portion of the computer program stored on the computer-readable medium may then be stored in the system memory 616 and/or various portions of the storage devices 632 and 633. When executed by the processor 614, a computer program loaded into the computing system 610 may cause the processor 614 to perform and/or be a means for performing the functions of one or more of the example embodiments described and/or illustrated herein. Additionally, or alternatively, one or more of the example embodiments described and/or illustrated herein may be implemented in firmware and/or hardware. For example, the computing system 610 may be configured as an Application Specific Integrated Circuit (ASIC) adapted to implement one or more of the example embodiments disclosed herein.

Figure 7:
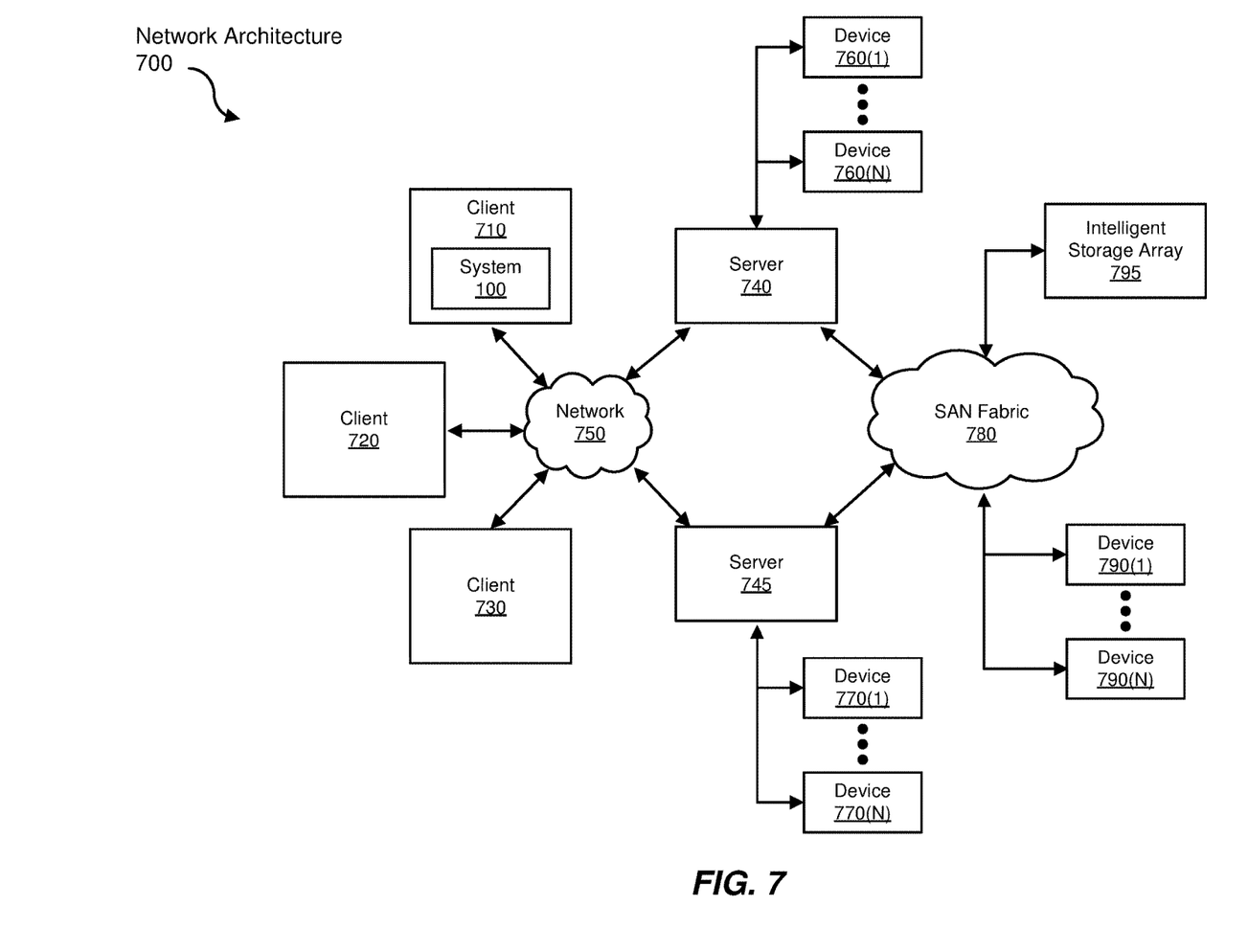
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of the network architecture 700 may perform and/or be a means for performing, either alone or in combination with other elements, one or more of the steps disclosed herein (such as one or more of the steps illustrated in FIG. 3). All or a portion of the network architecture 700 may also be used to perform and/or be a means for performing other steps and features set forth in the instant disclosure.

The client systems 710, 720, and 730 generally represent any type or form of computing device or system, such as example the computing system 610 in FIG. 6. Similarly, the servers 740 and 745 generally represent computing devices or systems, such as application servers or database servers, configured to provide various database services and/or run certain software applications. The network 750 generally represents any telecommunication or computer network including, for example, an intranet, a WAN, a LAN, a PAN, or the Internet. In one example, the client systems 710, 720, and/or 730 and/or the servers 740 and/or 745 may include all or a portion of the system 100 from FIG. 1.

As illustrated in FIG. 7, one or more storage devices 760(1)-(N) may be directly attached to the server 740. Similarly, the one or more storage devices 770(1)-(N) may be directly attached to the server 745. The storage devices 760(1)-(N) and the storage devices 770(1)-(N) generally represent any type or form of storage device or medium capable of storing data and/or other computer-readable instructions. In certain embodiments, the storage devices 760(1)-(N) and the storage devices 770(1)-(N) may represent Network-Attached Storage (NAS) devices configured to communicate with the servers 740 and 745 using various protocols, such as Network File System (NFS), Server Message Block (SMB), or Common Internet File System (CIFS).

The servers 740 and 745 may also be connected to a Storage Area Network (SAN) fabric 780. The SAN fabric 780 generally represents any type or form of computer network or architecture capable of facilitating communication between a plurality of storage devices. The SAN fabric 780 may facilitate communication between the servers 740 and 745 and a plurality of the storage devices 790(1)-(N) and/or an intelligent storage array 795. The SAN fabric 780 may also facilitate, via the network 750 and the servers 740 and 745, communication between the client systems 710, 720, and 730 and the storage devices 790(1)-(N) and/or the intelligent storage array 795 in such a manner that the devices 790(1)-(N) and they array 795 appear as locally attached devices to the client systems 710, 720, and 730. As with the storage devices 760(1)-(N) and the storage devices 770(1)-(N), the storage devices 790(1)-(N) and the intelligent storage array 795 generally represent any type or form of storage device or medium capable of storing data and/or other computer-readable instructions.

In certain embodiments, and with reference to the example computing system 610 of FIG. 6, a communication interface, such as communication interface 622 in FIG. 6, may be used to provide connectivity between each client system 710, 720, and 730 and the network 750. The client systems 710, 720, and 730 may be able to access information on the server 740 or 745 using, for example, a web browser or other client software. Such software may allow the client systems 710, 720, and 730 to access data hosted by the server 740, the server 745, the storage devices 760(1)-(N), the storage devices 770(1)-(N), the storage devices 790(1)-(N), or the intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by the server 740, the server 745, the storage devices 760(1)-(N), the storage devices 770(1)-(N), the storage devices 790(1)-(N), the intelligent storage array 795, or any combination thereof. All or a portion of one or more of the example embodiments disclosed herein may also be encoded as a computer program, stored in the server 740, run by the server 745, and distributed to the client systems 710, 720, and 730 over the network 750.

As detailed above, the computing system 610 and/or one or more components of the network architecture 700 may perform and/or be a means for performing, either alone or in combination with other elements, one or more steps of an example method for managing location-based access control lists.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of the example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of the example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally, or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of the example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of the example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of the example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of the example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for managing location-based access control lists, at least a portion of the method being performed by a computing device comprising at least one processor, the method comprising:

identifying a collection of devices that are located within a physical space, wherein the collection of devices comprises monitoring devices that are capable of monitoring user activity within the physical space;

determining, based on user activity data received from the collection of devices, that an authorized user is attempting to modify, on a location-based access control list for a wireless network, access rights of a target computing device near a location indicated by the authorized user in the physical space;

detecting, based on the user activity data, the target computing device near the location indicated by the authorized user; and in response to detecting the target computing device indicated by the authorized user, modifying, on the location-based access control list, the access rights of the target computing device, thereby enabling the target computing device to join the wireless network.

2. The computer-implemented method of claim 1, wherein the user activity data comprises a photograph or a video recording of the authorized user and detecting the target computing device near the location indicated by the authorized user further comprises:

analyzing the photograph or the video recording;

identifying the location in the physical space based on the analyzed photograph or video recording; and detecting the target computing device near the location indicated by the authorized user.

3. The computer-implemented method of claim 2, wherein the analyzed photograph or video recording comprises data indicating the authorized user pointing to the target computing device with a hand or a pointing device.

4. The computer-implemented method of claim 1, wherein the user activity data comprises an audio recording of the authorized user and detecting the target computing device near the location indicated by the authorized user based on the user activity data further comprises:

analyzing the audio recording;

identifying the location in the physical space based on the analyzed audio recording; and detecting the target computing device near the location indicated by the authorized user.

5. The computer-implemented method of claim 1, wherein modifying the location-based access control list comprises at least one of:

adding the target computing device to the location-based access control list; or removing the target computing device from the location-based access control list.

6. The computer-implemented method of claim 1, further comprising:

enforcing the location-based access control list based on one or more scheduling policies.

7. The computer-implemented method of claim 1, wherein detecting the target computing device near the location in the physical space comprises:

receiving, at a plurality of access points, signals from the target computing device;

performing, by the at least one processor, triangulation of the signals to determine a location associated with the signals; and detecting the target computing device by comparing the location associated with the signals to the location indicated by the authorized user in the physical space.

8. A system for managing location-based access control lists, the system comprising:
at least one physical processor;
physical memory comprising computer-executable instructions that, when executed by the physical processor, cause the physical processor to:
identify a collection of devices that are located within a physical space, wherein the collection of devices comprises monitoring devices that are capable of monitoring user activity within the physical space;
determine, based on user activity data received from the collection of devices, that an authorized user is attempting to modify, on a location-based access control list for a wireless network, access rights of a target computing device near a location indicated by the authorized user in the physical space;
detect, based on the user activity data, the target computing device near the location indicated by the authorized user; and
in response to detecting the target computing device indicated by the authorized user, modify, on the location-based access control list, the access rights of the target computing device, thereby enabling the target computing device to join the wireless network.

9. The system of claim 8, wherein the user activity data comprises a photograph or a video recording of the authorized user and wherein, to detect the target computing device near the location indicated by the authorized user, the computer-executable instructions further cause the physical processor to:
analyze the photograph or the video recording;
identify the location in the physical space based on the analyzed photograph or video recording; and
detect the target computing device near the location indicated by the authorized user.

10. The system of claim 9, wherein the analyzed photograph or video recording comprises data indicating the authorized user pointing to the target computing device with a hand or a pointing device.

11. The system of claim 8, wherein the user activity data comprises an audio recording of the authorized user and wherein, to detect the target computing device near the location indicated by the authorized user based on the user activity data, the computer-executable instructions further cause the physical processor to:
analyze the audio recording;
identify the location in the physical space based on the analyzed audio recording; and
detect the target computing device near the location indicated by the authorized user.

12. The system of claim 8, wherein, to modify the location-based access control list, the computer-executable instructions further cause the physical processor to at least one of:
add the target computing device to the location-based access control list; or
remove the target computing device from the location-based access control list.

13. The system of claim 8, wherein the computer-executable instructions further cause the physical processor to:
enforce the location-based access control list based on one or more scheduling policies.

14. The system of claim 8, wherein, to detect the target computing device near the location in the physical space, the computer-executable instructions further cause the physical processor to:
receive, at a plurality of access points, signals from the target computing device;
perform, by the at least one physical processor, triangulation of the signals to determine a location associated with the signals; and
detect the target computing device by comparing the location associated with the signals to the location indicated by the authorized user in the physical space.

15. A non-transitory computer-readable medium comprising one or more computer-executable instructions that, when executed by at least one processor of a computing device, cause the computing device to:
identify a collection of devices that are located within a physical space, wherein the collection of devices comprises monitoring devices that are capable of monitoring user activity within the physical space;
determine, based on user activity data received from the collection of devices, that an authorized user is attempting to modify, on a location-based access control list for a wireless network, access rights of a target computing device near a location indicated by the authorized user in the physical space;
detect, based on the user activity data, the target computing device near the location indicated by the authorized user; and
in response to detecting the target computing device indicated by the authorized user, modify, on the location-based access control list, the access rights of the target computing device, thereby enabling the target computing device to join the wireless network.

16. The non-transitory computer-readable medium of claim 15, wherein the user activity data comprises a photograph or a video recording of the authorized user and wherein, to detect the target computing device near the location indicated by the authorized user, the one or more computer-executable instructions further cause the computing device to:
analyze the photograph or the video recording;
identify the location in the physical space based on the analyzed photograph or video recording; and
detect the target computing device near the location indicated by the authorized user.

17. The non-transitory computer-readable medium of claim 16, wherein the analyzed photograph or video recording comprises data indicating the authorized user pointing to the target computing device with a hand or a pointing device.

18. The non-transitory computer-readable medium of claim 15, wherein the user activity data comprises an audio recording of the authorized user and wherein, to detect the target computing device near the location indicated by the authorized user based on the user activity data, the one or more computer-executable instructions further cause the computing device to:
analyze the audio recording;
identify the location in the physical space based on the analyzed audio recording; and
detect the target computing device near the location indicated by the authorized user.

19. The non-transitory computer-readable medium of claim 15, wherein, to modify the location-based access control list, the one or more computer-executable instructions further cause the computing device to at least one of:
add the target computing device to the location-based access control list; or
remove the target computing device from the location-based access control list.

20. The non-transitory computer-readable medium of claim 15, wherein the one or more computer-executable instructions further cause the computing device to:
 enforce the location-based access control list based on one or more scheduling policies.

\* \* \* \* \*